United States Patent Office 3,151,105
Patented Sept. 29, 1964

3,151,105
MONOAZO DYESTUFFS CONTAINING A 3,6,8-TRISULFONAPHTHYL DIAZO COMPONENT
Herbert Francis Andrew and Donald Buckley, Manchester, England, assignors to Imperial Chemical Industries Limited, London, England, a corporation of Great Britain
No Drawing. Filed Feb. 23, 1962, Ser. No. 175,313
Claims priority, application Great Britain, Mar. 24, 1961, 10,842/61
3 Claims. (Cl. 260—153)

This invention relates to new azo dyestuffs. More particularly, the invention relates to monoazo dyestuffs valuable as reactive dyestuffs for textile materials containing acylatable hydroxyl and/or amino groups, such as natural and regenerated cellulose, wool, silk and superpolyamide fibres.

According to the invention there are provided the monoazo compounds of the formula:

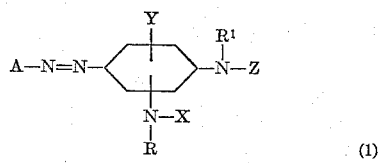

wherein A stands for a trisulphonated naphthyl radical,

Y stands for a chlorine or hydrogen atom or an alkoxy or alkyl group having 1 to 4 carbon atoms, X stands for an aliphatic acyl group containing up to 5 carbon atoms, R and $R^1$ independently stand for a hydrogen atom or an alkyl group of 1 to 4 carbon atoms, and Z stands for an acyl radical which contains a reactive group, i.e. a group capable of reaction with the fibre to form a covalent bond.

As examples of naphthyl radicals represented by A, there may be mentioned, for example, 3,6,8-trisulpho-2-naphthyl, 1,5,7-trisulpho-2-naphthyl, 1,3,7-trisulpho-2-naphthyl, 2,4,6-trisulpho-1-naphthyl, 2,4,7-trisulpho-1-naphthyl, 2,5,7-trisulpho-1-naphthyl, 3,6,8-trisulpho-1-naphthyl and 4,6,8-trisulpho-1-naphthyl.

As examples of aliphatic acyl groups represented by X, there may be mentioned, for example, the radicals of aliphatic carboxylic and sulphonic acids, such as formic, acetic, butyric, methane-sulphonic and propylsulphonic acids and radicals of carbamic acid containing up to 5 carbon atoms such as carbamic, N-methyl carbamic and N,N-diethylcarbamic acids.

As examples of acyl radicals which are represented by Z there may be mentioned, for example, the radicals of α:β-unsaturated aliphatic carboxylic acids such as acrylic acid, α-chloroacrylic acid, propiolic acid, maleic acid and mono- and di-chloromaleic acids; more particularly, Z may represent the radical of an acid which contains a labile halogen atom or a group which readily splits off to form an anion, for example, the radical of a halogenated aliphatic acid such as chloroacetic acid, β-chloro and β-bromo-propionic acids and α,β-dichloropropionic acid or more especially a heterocyclic radical which contains from 2 to 3 nitrogen atoms in the heterocyclic ring and at least one halogen atom or other labile substituent on a carbon atom.

As examples of such heterocyclic radicals, there may be mentioned, for example, s-triazines and pyrimidines which contain bromine, or, preferably, chlorine atoms, sulphonic acid groups, thiocyano groups, negatively substituted aryloxy and arylthio groups, such as sulphophenoxy, sulphophenylthio, nitrosulphophenoxy, disulphenoxy and sulphonaphthoxy groups, or which contain groups of the formula:

wherein Y represents the group of atoms necessary to form a 5- or 6-membered heterocyclic ring which may carry substituents or form part of a fused ring system; or which contain quaternary ammonium or pyrimidinium groups; or which contain groups of the formula:

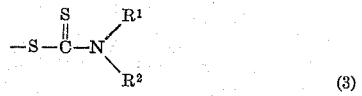

wherein $R^1$ and $R^2$ each represents the same or different alkyl, cycloalkyl, aryl or aralkyl groups, or $R^1$ and $R^2$ together form, together with the nitrogen atom, a 5- or 6-membered heterocyclic ring; or which contain groups of the formula:

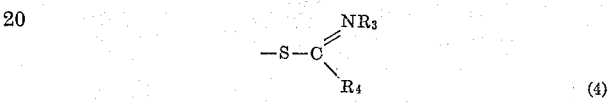

wherein $R_3$ and $R_4$ may be the same or different and each represents a hydrogen atom or an alkyl, aryl or aralkyl group.

In the cases where the pyrimidine ring or triazine ring carries only one labile atom or group, the said ring may have one or more additional substituents on the remaining carbon atoms. As examples of such substituents, there may be mentioned, for example, cyano groups, amino and substituted amino groups such as methylamino, ethylamino, dimethylamino, β-hydroxyethylamino, di(β-hydroxyethyl)amino, cyclohexylamino, phenylamino, sulphophenylamino, disulphophenylamino, carboxy sulphophenylamino, and carboxyphenylamino; alkoxy groups, preferably those containing from one to four carbon atoms; aryloxy groups, especially phenoxy, chlorophenoxy and methylphenoxy groups; and phenyl thio groups.

It is preferred that Z represents a triazine ring containing one or two chlorine atoms.

According to a further feature of the invention, there is provided a process for manufacture of the new azo dyestuffs which comprises interacting a monoazo compound of the formula:

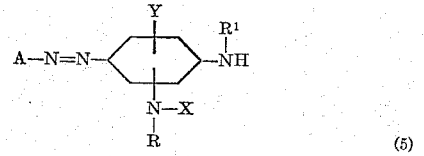

wherein A, X, Y, R and $R^1$ have the meanings stated above, with the acid halide or anhydride of an acid which contains a group capable of reaction with the fibre to form a covalent bond.

The treatment of the monoazo compound with the acid halide or anhydride may conveniently be carried out by stirring an aqueous solution of the compound with an aqueous suspension or solution of the acid halide or anhydride; the temperature of the reaction may vary from 0° to 100° C. dependent on the ease with which water will react with the acid halide or anhydride group or the group capable of reacting with the fibre.

As examples of anhydrides or acid halides which may be used, there may be mentioned for example, the anhydrides or acid halides of α; β-unsaturated aliphatic acids such as chloromaleic anhydride, propiolyl chloride and acrylyl chloride, the acid chlorides of halogenated aliphatic acids such as chloroacetyl chloride, sulpho-chloroacetyl chloride, β-bromo and chloropropionyl chloride and α-β-dichloropropionyl chloride and preferably, heterocyclic compounds which contain at least 2 nitrogen atoms in the heterocyclic rings and which contain 2 or more halogen, especially chlorine, atoms in the ortho positions to the nitrogen atoms, such as 2,4,6-tri-bromo and tri-chloropyrimidines, 2,4,5,6-tetrachloropyrimidine, 5-methyl-2,4,6-trichloropyrimidine, 5 - nitro-2,4,6-trichloropyrimidine, 2,4 - dichloro-5-nitro-6-methyl pyrimidine, 2,4-dichloro-5-nitropyrimidine, 2,4,6-trichloro - 5 - cyanopyrimidine, 5-carboethoxy-2,4-dichloropyrimidine, 5-carboxy-2,4-dichloropyrimidine, cyanuric bromide and, preferably cyanuric chloride and the primary condensation products of cyanuric bromide or cyanuric chloride with ammonia or an organic mercaptan, hydroxy compound or an organic primary or secondary amine, for example, methanol, ethanol, iso-propanol, phenol o, m- and p-chlorophenols, o-, m and p-cresols, o, m- and p-sulphophenols, thiophenol, thioglycollic acid, dimethyldithiocarbamic acid, mercaptobezthiazole, methyl-, dimethyl-, ethyl, diethyl, n-propyl, iso-propyl-, butyl-, hexyl- or cyclohexyl-amine, toluidine, piperidine, morpholine, methoxyethylamine, ethanolamine, aminoacetic acid, aniline-2:5-disulphonic acid, orthanilic, metanilic and sulphanilic acids, 2-, 3- and 4-aminobenzoic acids, 5-amino-2-hydroxybenzoic acid, 2-aminoethane-sulphonic acid, aminonaphthalene mono- and di-sulphonic acids and N-methylamino ethane sulphonic acid.

The aminoazo compounds of Formula 5 may be obtained by diazotising a trisulphonated naphthylamine and coupling the diazonium compound so obtained with a compound of the formula:

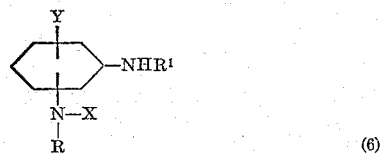

(6)

As examples of trisulphonated naphthylamines which may be used for this purpose, there may be mentioned, for example, 2-naphthylamine-3,6,8-trisulphonic acid, 2-naphthylamine-1:5:7-trisulphonic acid, 2-naphthylamine-1,3,7-trisulphonic acid, 1-naphthylamine-2,4,6-trisulphonic acid, 1-naphthylamine-2,4,7-trisulphonic acid, 1-naphthylamine-2,5,7-trisulphonic acid, 1-naphthylamine-3,6,8-trisulphonic acid and 1-naphthylamine-4,6,8-trisulphonic acid.

As examples of compounds of Formula 6 which may be used for this purpose, there may be mentioned, for example, m-aminoacetanilide, 3-hydroxy-acetylaminoaniline, 2-methoxy-5-acetylaminoaniline, m-ureidoaniline, 2-methyl-5-acetylaminoaniline, m-aminopropionanilide, 3-methanesulphonylaminoaniline, 3 - carbethoxyaminoaniline, and anilide.

If desired, the new azo dyestuffs which contain, as the reactive group, a heterocyclic ring containing only a single chlorine or bromine atom, or one or two other labile groups on the heterocyclic ring may be obtained by taking one of the new azo dyestuffs containing two chlorine or bromine atoms attached to the heterocyclic ring and replacing one or both of these atoms by the appropriate group. This modified process forms a further feature of the invention. Thus, an amino or substituted amino group may be introduced by reaction with ammonia or a primary or secondary amine; an alkoxy or aryloxy (including negatively substituted aryloxy) group may be introduced by reaction with an alcohol, or aromatic hydroxyl compound; a sulphonic acid group may be introduced by reaction with an alkali metal sulphite; a thiocyano group may be introduced by reaction with potassium thiocyanate; a group of Formula 2 above may be introduced by reaction with the alkali metal salt of a mercaptoheterocyclic compound such as 2-mercaptobenzthiazole, 2-mercaptobenzselenazole, 2-mercaptobenziminazole, 2 - mercaptobenzoxazole, 2 - mercaptopyridine, 2-mercapto - 6 - methoxybenzthiazole, 2-mercapto-6-acetylaminobenzthiazole, 2-mercapto - 6 - sulphobenzthiazole; a quaternary group may be introduced by treatment with pyridine or other tertiary amine; a group of Formula 3 above may be introduced by reaction with the appropriately substituted alkali dithiocarbamate such as sodium diethyl - dithiocarbamate, sodium dimethyldithiocarbamate, sodium diphenyl-dithiocarbamate and sodium pentamethylenedithiocarbamate; and a group of Formula 4 above may be introduced by reaction with a thio amide such as thio-acetamide and thioacetanilide.

The new monoazo dyestuffs are valuable for colouring cellulose textile materials, for example, textile materials comprising natural or regenerated cotton. For colouring such textile materials, the new azo dye stuffs are preferably applied, either by a dyeing or printing process, to the cellulose textile materials in conjunction with a treatment with an acid-binding agent, for example sodium hydroxide, sodium carbonate or sodium bicarbonate, which may be applied to the cellulose textile material before, during or after the application of the dyestuffs. When so applied to cellulose textile materials the new azo dyestuffs react with the cellulose and yield reddish-yellow shades possessing excellent fastness to light, to washing and to treatments with hypochlorite bleach. They are also distinguished by the low amount of staining caused by unreacted dyestuff on adjacent textile material during washing treatments after the colouration process.

The invention is illustrated but not limited by the following examples in which parts are by weight:

*Example 1*

A solution of 4.1 parts of cyanuric chloride in 30 parts of acetone is poured into a stirred mixture of 30 parts of crushed ice at 0–3° C. A solution of 12.2 parts of trisodium 2-(2'-acetylamino - 4' - aminophenylazo) naphthalene-3:6:8-trisulphonate in 150 parts of water at pH 7.0 is added and the mixture is stirred for 3 hours, 10 parts of 2 N sodium carbonate solution being added to maintain the pH at 7.0 and the temperature being maintained at 0–3° C. by external cooling. The suspension is buffered at pH approximately 6.6 and 25 parts of sodium chloride are added. The precipitated dyestuff is filtered off, slurried in acetone, refiltered and dried. Analysis shows the dyestuff contains two hydrolysable chlorine atoms per molecule.

It yields bright reddish-yellow shades on cellulose materials which possess very good fastness to light and washing.

*Example 2*

A solution of 4.1 parts of cyanuric chloride in 30 parts of acetone is poured into a stirred mixture of 30 parts of crushed ice at 0–3° C. Into the suspension of cyanuric chloride so obtained is added 4 parts of ammonia of specific gravity 0.89 and the mixture is stirred at 0–3° C. for 1½ hours. The alkalinity to Brilliant Yellow paper is just removed by adding 2 N hydrochloric acid and a solution of 12.2 parts of trisodium 2-(2'-acetylamino-4'-aminophenylazo)naphthalene-3:6:8 - trisulphonate in 150 parts of water is added at pH 7.0. The mixture is stirred at 50° C. for 8-10 hours and cooled.

30 parts of sodium chloride are added and the precipitated dyestuff is filtered off, slurried in acetone, refiltered and dried at 40–50° C. Analysis shows the dyestuff contains one hydrolysable chlorine atom per molecule.

It yields bright reddish-yellow dyeings and prints on cellulose materials possessing very good fastness to light and to washing.

The same dyestuff may be obtained if, in Example 1, 10 parts of ammonia solution of specific gravity 0.89 are added to the suspension of dyestuff instead of adding buffer and the mixture is stirred at 35–40° C. for 3 hours.

*Example 3*

In Example 2 there is added a solution of 3.85 parts of metanilic acid in 30 parts of water, neutralised to pH 7.0 by adding sodium hydroxide solution, in place of ammonia. The condensation with the aminoazo compound is carried out at 35–40° C. for 3 hours, 10 parts of 2 N sodium carbonate solution being added to maintain the pH at 7.0. The solution is cooled to room temperature and 25 parts of sodium chloride followed by 50 parts of anhydrous potassium acetate are added. The mixture is stirred for 30 minutes and the precipitated dyestuff is filtered off, slurried in alcohol, refiltered and dried at 40–50° C. Analysis shows that the dyestuff contains one atom of hydrolysable chlorine per molecule.

It yields bright reddish-yellow dyeings and prints possessing very good fastness to light and washing.

filtered off, slurried in alcohol, refiltered and dried at 40–50° C. Analysis shows that the dyestuff contains one atom of hydrolysable chlorine per molecule and is identical in properties with the dyestuff prepared as described in Example 3.

It yields bright reddish-yellow dyeings and prints possessing very good fastness to light and washing.

The following table shows the results of condensation by the method of Example 4 in which cyanuric chloride is condensed with the aminoazo compounds obtained from the components mentioned in columns I and II by coupling, and the product condensed with the third components mentioned in column III. The shades of the resulting monochlorotriazine dyestuffs are given in column IV.

| Example | I<br>Diazo Component | II<br>Coupling Component | III<br>Third Component | IV |
|---|---|---|---|---|
| 5 | 2-naphthylamine-3:6:8-trisulphonic acid | 3-aminoacetanilide | Methylamine | Reddish-yellow. |
| 6 | ----do---- | ----do---- | Isobutylamine | Do. |
| 7 | ----do---- | ----do---- | Taurine | Do. |
| 8 | ----do---- | ----do---- | Morpholine | Do. |
| 9 | ----do---- | ----do---- | 2-aminoethanol | Do. |
| 10 | ----do---- | ----do---- | Aniline | Do. |
| 11 | ----do---- | ----do---- | N-methylaniline | Do. |
| 12 | ----do---- | ----do---- | 4-sulphoaniline | Do. |
| 13 | ----do---- | ----do---- | 3:5-disulphoaniline | Do. |
| 14 | ----do---- | ----do---- | 4-sulphoanthranilic acid | Do. |
| 15 | ----do---- | ----do---- | 5-sulphoanthranilic acid | Do. |
| 16 | ----do---- | ----do---- | 3-sulpho-N-methylaniline | Do. |
| 17 | ----do---- | ----do---- | 4-sulpho-N-methylaniline | Do. |
| 18 | ----do---- | ----do---- | 2-mercaptobenzthiazole | Do. |
| 19 | ----do---- | ----do---- | 4-sulphophenol | Do. |
| 20 | ----do---- | ----do---- | 6-sulpho-2-naphthol | Do. |
| 21 | ----do---- | ----do---- | Potassium dithiocarbamate | Do. |
| 22 | ----do---- | ----do---- | Potassium diethyl dithiocarbamate. | Do. |
| 23 | 2-naphthylamine-1:5:7-trisulphonic acid | ----do---- | Ammonia | Do. |
| 24 | 2-naphthylamine-1:3:7-trisulphonic acid | ----do---- | ----do---- | Do. |
| 25 | 1-naphthylamine-2:4:6-trisulphonic acid | ----do---- | 3-sulphoaniline | Do. |
| 26 | 1-naphthylamine-2:4:7-trisulphonic acid | ----do---- | ----do---- | Do. |
| 27 | 1-naphthylamine-2:5:7-trisulphonic acid | ----do---- | ----do---- | Do. |
| 28 | 1-naphthylamine-3:6:8-trisulphonic acid | ----do---- | ----do---- | Do. |
| 29 | 1-naphthylamine-4:6:8-trisulphonic acid | ----do---- | ----do---- | Do. |
| 30 | 3-carboxy-2-naphthylamine-6:8-disulphonic acid. | ----do---- | ----do---- | Do. |
| 31 | 2-naphthylamine-3:6:8-trisulphonic acid | 3-methesulphonylamine aniline | Ammonia | Do. |
| 32 | ----do---- | 3-aminopropionanilide | ----do---- | Do. |
| 33 | ----do---- | 3-carbethoxyaminoaniline | ----do---- | Do. |
| 34 | ----do---- | 3-hydroxyacetylaminoaniline | ----do---- | Do. |
| 35 | ----do---- | 3-amino-N-methylacetanilide | ----do---- | Do. |
| 36 | ----do---- | 2-methoxy-5-acetylaminoaniline | ----do---- | Orange. |
| 37 | ----do---- | ----do---- | 3-sulphoaniline | Do. |
| 38 | ----do---- | ----do---- | 5-sulphoanthranilic acid | Do. |
| 39 | ----do---- | ----do---- | 3:5-disulphoaniline | Do. |
| 40 | ----do---- | ----do---- | N-methylaniline | Do. |
| 41 | 1-naphthylamine-2:5:7-trisulphonic acid | ----do---- | Ammonia | Do. |
| 42 | 2-naphthylamine-3:6:8-trisulphonic acid | 2-methyl-5-acetylamino aniline | ----do---- | Reddish-yellow. |
| 43 | ----do---- | 3-ureidoaniline | ----do---- | Golden yellow. |
| 44 | ----do---- | ----do---- | N-methylaniline | Do. |
| 45 | ----do---- | ----do---- | 3-sulphoaniline | Do. |
| 46 | ----do---- | ----do---- | 3:5-disulphoaniline | Do. |
| 47 | ----do---- | 2-methoxy-5-ureidoaniline | Ammonia | Orange. |
| 48 | ----do---- | ----do---- | N-methylaniline | Do. |
| 49 | ----do---- | ----do---- | 3-sulphoaniline | Do. |
| 50 | ----do---- | ----do---- | 3:5-disulphoaniline | Do. |
| 51 | ----do---- | 3-methylaminoacetanilide | Ammonia | Reddish-yellow. |
| 52 | ----do---- | ----do---- | 3-sulphoaniline | Do. |
| 53 | ----do---- | ----do---- | 4-sulphoaniline | Do. |
| 54 | ----do---- | ----do---- | 3:5-disulphoanilide | Do. |
| 55 | ----do---- | ----do---- | 5-sulphoanthranilic acid | Do. |
| 56 | ----do---- | ----do---- | N-methylaniline | Do. |
| 57 | ----do---- | ----do---- | 3-sulpho-N-methylaniline | Do. |
| 58 | ----do---- | ----do---- | 4-sulpho-N-methylaniline | Do. |

If in place of metanilic acid in this example there are used molecular equivalent amounts of aniline-3:5-disulphonic acid, sulphanilic acid, 4-sulphoanthranilic acid or 5-sulphoanthranilic acid there are obtained reddish-yellow dyestuffs having similar properties.

Example 4

A solution of 3.85 parts of metanilic acid in 30 parts of water is neutralised to pH 7.0 by adding sodium hydroxide solution and added to a suspension of the dyestuff prepared as described in Example 1. The mixture is stirred at 35–40° C. for 3 hours, 10 parts of 2 N sodium carbonate solution being added to maintain the pH at 7.0. The solution is cooled to room temperature and 25 parts of sodium chloride followed by 50 parts of anhydrous potassium acetate are added. The mixture is stirred for 30 minutes and the precipitated dyestuff is

Example 59

If in Example 1 there are used 12.5 parts of trisodium 2-(2' - acetylamino - 4' - N - methylaminophenylazo)-naphthalene-3:6:8-trisulphonate in 150 parts of water in place of the 12.2 parts of trisodium 2-(2'-acetylamino-4'-aminophenylazo)-naphthalene-3:6:8 - trisulphonate there is obtained a dyestuff which contains two hydrolysable atoms of chlorine per molecule.

It yields bright reddish-yellow shades on cellulose materials which possess very good fastness to light and washing.

Example 60

If in Example 1 there are used 7.0 parts of cyanuric bromide in place of the 4.1 parts of cyanuric chloride there is obtained a similar dyestuff containing two hydrolysable atoms of bromine per molecule, which yields bright reddish-yellow dyeings and pirnts on cellulose materials which possess very good fastness to light and washing.

Example 61

A solution of 4.0 parts of 2:4-dichloro-6-methoxy-s-triazine in 30 parts of acetone is poured into a solution of 12.2 parts of trisodium 2-(2'-acetylamino-4'-aminophenylazo)-naphthalene-3:6:8-trisulphonate in 120 parts of water at pH 7.0. The mixture is stirred at 35–40° C. for 3 hours, 10 parts of 2 N sodium carbonate solution being added to maintain the pH at 7.0. The solution is cooled to room temperature and 20 parts of sodium chloride are added. The mixture is stirred to dissolve the sodium chloride and 200 parts of ethanol are added. The mixture is stirred for 30 minutes and the precipitated dyestuff is filtered off, slurried in acetone and dried at 40–50° C. Analysis shows that the dyestuff contains one atom of hydrolysable chlorine per molecule.

It yields bright reddish yellow dyeings and prints possessing very good fastness to light and washing.

Example 62

To a solution of 14.8 parts of the monochlorotriazinyl-dyestuff prepared as described in Example 2 in 150 parts of water, there are added 40 parts of pyridine. The mixture is stirred at 85° C. for 15 minutes, cooled to room temperature and poured into 500 parts of acetone. The precipitated dyestuff is filtered off and dried at 40–50° C. Analysis shows the dyestuff contains no hydrolysable chlorine atoms per molecule.

It yields reddish-yellow shades on cellulose materials which possess very good fastness to light and washing.

Example 63

To a solution of 18.3 parts of the monochlorotriazinyl dyestuff prepared as described in Example 3 in 150 parts of water there are added 40 parts of pyridine. The mixture is stirred at 85° C. for 15 minutes, cooled to room temperature and poured into 600 parts of acetone. The precipitated dyestuff is filtered off and dried at 40–50° C. Analysis shows the dyestuff contains no hydrolysable atoms of chlorine per molecule.

It yields reddish-yellow shades on cellulose materials which possess very good fastness to light and washing.

Example 64

To a solution of 15.2 parts of the dichlorotriazinyl dyestuff, prepared as described in Example 1, in 150 parts of water at pH 7.0 there are added 12 parts of 40% sodium bisulphite solution and 5.4 parts of 32% sodium hydroxide solution. The solution is stirred at room temperature for 18 hours. The solution is buffered at pH 6.6 by adding 5 parts of a mixture of 1 part of sodium bisulphate and 16 parts of sodium diethylmetanilate. 15 parts of sodium chloride are added followed by 150 parts of ethanol and the precipitated dyestuff is filtered off, slurried in acetone and dried at 40–50° C. Analysis shows the dyestuff contains no hydrolysable atoms of chlorine per molecule.

It yields reddish-yellow shades on cellulose materials which possess very good fastness to light and washing.

Example 65

To a solution of 12.2 parts of trisodium 2-(2'-acetyl-amino-4'-aminophenylazo)naphthalene-3:6:8 - trisulphonate in 120 parts of water is added a solution of 4.8 parts of tetrachloropyrimidine in 150 parts of dioxan. The mixture is stirred under reflux for 48 hours at 90° C., 2 N sodium carbonate solution being added to maintain the pH at 7.0. When the reaction is complete the mixture is evaporated to one half of the original volume and 15 parts of sodium chloride added. The precipitated dyestuff is filtered off and dried at 40–50° C.

It yields reddish-yellow dyeings and prints on cellulose materials which possess very good fastness to light and washing.

Example 66

12.2 parts of trisodium 2-(2'-acetylamino-4'-amino-phenylazo)naphthalene-3:6:8-trisulphonate are dissolved in 120 parts of water and to the solution is added a solution of 4.6 parts of 5-cyano-2:4:6-trichloropyrimidine in 30 parts of acetone. The mixture is stirred at 50° C. for four hours, 9 parts of 2 N sodium carbonate solution being added to maintain the pH at 7.0. The mixture is cooled, filtered and poured into 1000 parts of acetone. The precipitated dyestuff is filtered off and dried at 40–50° C. Analysis shows that the dyestuff contains two hydrolysable chlorine atoms per molecule.

It yields reddish-yellow dyeings and prints on cellulose materials which possess very good fastness to light and washing.

Example 67

If in Example 66 there is used in equivalent quantity of trichloropyrimidine in place of 5-cyano-2:4:6-trichloropyrimidine there is obtained a dyestuff which yields bright reddish-yellow dyeings and prints on cellulose materials which possess very good fastness to light and washing.

Example 68

9 parts of acrylyl chloride dissolved in 20 parts of acetone are cautiously added to a neutral solution of 12.2 parts of 2-(2'-acetylamino-4'-aminophenylazo)naphthalene-3:6:8-trisulphonate in 120 parts of water at 0° C. The solution is allowed to warm up to room temperature and is stirred for 20 hours, 2 N sodium carbonate solution being added to maintain the pH at 7.0. When the condensation is complete 20 parts of sodium chloride are added and the precipitated dyestuff is filtered off, slurried in acetone and dried at 40–50° C.

It yields reddish-yellow shades on cellulose materials which possess very good fastness to light and washing.

Example 69

If in Example 68 there are used 13 parts of α-chloroacrylyl chloride in place of the acrylyl chloride there is obtained a dyestuff which yields reddish-yellow shades on cellulose materials possessing very good fastness to light and washing.

Example 70

If in Example 68 there are used 14 parts of α-chloroacetyl chloride in place of the acrylyl chloride there is obtained a dyestuff which yields reddish-yellow shades on cellulose materials possessing very good fastness to light and washing.

What we claim is:

1. A compound of the formula:

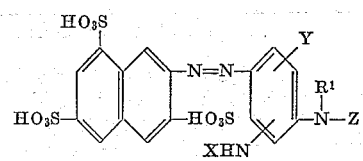

wherein

Y stands for a member selected from the group consisting of hydrogen, lower alkyl, and lower alkoxy;
X stands for a saturated aliphatic acyl group containing from 1 to 5 carbon atoms;
$R^1$ stands for a member selected from the group consisting of hydrogen and methyl; and
Z is a reactive radical selected from the class consisting of acyl radicals of α,β-unsaturated lower aliphatic carboxylic acids, acyl radicals of chloro-substituted lower aliphatic acids, dibromo-s-triazinyl, dichloro-s-triazinyl, radicals of the formula:

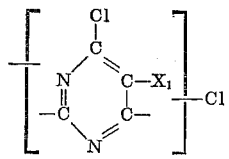

in which $X_1$ is selected from H, Cl and CN, radicals of the formula:

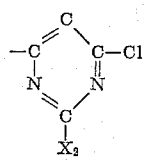

in which $X_2$ is selected from the class consisting of Cl, $NH_2$, sulphoanilino, disulphoanilino, sulphocarboxyanilino, lower alkylamino, β-sulphoethylamino, morpholino, β-hydroxyethylamino, anilino, N-methylanilino, N-methylsulphoanilino, benzthiazol-2-ylthio, sulphophenoxy, sulphonaphthoxy, dithiocarbamyl, di(lower alkyl) thiocarbamyl and lower alkoxy, and radicals of the formula:

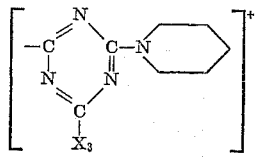

in which X is selected from the class consisting of amino and sulphanilino.

2.

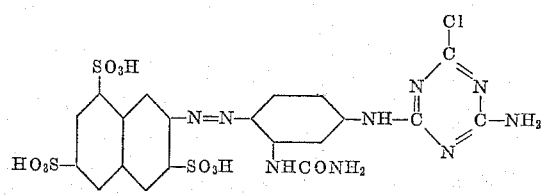

3.

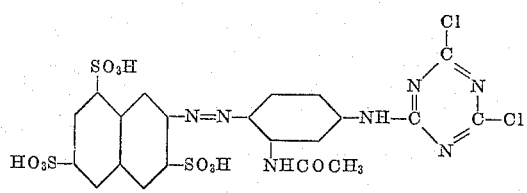

References Cited in the file of this patent
UNITED STATES PATENTS

| | | |
|---|---|---|
| 2,903,442 | Riat | Sept. 8, 1959 |
| 2,945,022 | Fasciati et al. | July 12, 1960 |
| 2,951,071 | Tilley | Aug. 30, 1960 |
| 2,951,072 | Tilley et al. | Aug. 30, 1960 |
| 2,951,836 | Stephen | Sept. 6, 1960 |
| 2,951,837 | Andrew et al. | Sept. 6, 1960 |
| 3,040,024 | Riat et al. | June 19, 1962 |

FOREIGN PATENTS

| | | |
|---|---|---|
| 224,012 | Australia | Dec. 1, 1960 |